United States Patent
Lee et al.

(10) Patent No.: US 11,162,183 B2
(45) Date of Patent: Nov. 2, 2021

(54) ELECTROLYTIC COPPER FOIL FOR SECONDARY BATTERY, HAVING ENHANCED PHYSICAL PROPERTIES AT LOW TEMPERATURE, AND METHOD FOR PRODUCING SAME

(71) Applicant: ILJIN MATERIALS CO., LTD., Iksan (KR)

(72) Inventors: Sun Hyoung Lee, Iksan (KR); Tae Jin Jo, Iksan (KR); Seul-Ki Park, Iksan (KR); Ki Deok Song, Iksan (KR)

(73) Assignee: ILJIN MATERIALS CO., LTD., Iksan-si (KR)

( * ) Notice: Subject to any disclaimer, the term of this patent is extended or adjusted under 35 U.S.C. 154(b) by 118 days.

(21) Appl. No.: 16/343,539

(22) PCT Filed: Mar. 28, 2017

(86) PCT No.: PCT/KR2017/003373
§ 371 (c)(1),
(2) Date: Apr. 19, 2019

(87) PCT Pub. No.: WO2018/088644
PCT Pub. Date: May 17, 2018

(65) Prior Publication Data
US 2019/0330754 A1    Oct. 31, 2019

(30) Foreign Application Priority Data

Nov. 11, 2016    (KR) .................. 10-2016-0150361

(51) Int. Cl.
*H01M 4/66*    (2006.01)
*H01M 4/70*    (2006.01)
(Continued)

(52) U.S. Cl.
CPC .............. *C25D 3/38* (2013.01); *C25D 1/04* (2013.01); *C25D 7/0614* (2013.01); *H01M 4/0452* (2013.01); *H01M 4/38* (2013.01)

(58) Field of Classification Search
None
See application file for complete search history.

(56) References Cited

U.S. PATENT DOCUMENTS

| | | | |
|---|---|---|---|
| 5,958,209 A | 9/1999 | Sakai | |
| 2005/0230014 A1* | 10/2005 | Ishida | C22C 9/00 |
| | | | 148/683 |

(Continued)

FOREIGN PATENT DOCUMENTS

| | | |
|---|---|---|
| JP | 2013-019037 B2 | 1/2013 |
| JP | 2014-111827 B2 | 6/2014 |

(Continued)

*Primary Examiner* — Tracy M Dove
(74) *Attorney, Agent, or Firm* — Patent Office of Dr. Chung Park

(57) ABSTRACT

The present invention relates to an electrolytic copper foil for a secondary battery, having excellent physical properties at a low temperature, and a method for producing the electrolytic copper foil. The electrolytic copper foil for a secondary battery shows little change in the physical properties, such as tensile strength and elongation, of a copper foil even at a low temperature and thereby exhibits excellent cycle properties at the low temperature. The electrolytic copper foil for a secondary battery is produced from a plating solution, containing total organic carbon (TOC), cobalt, iron and zinc, by using a drum and coated with a negative electrode active material, wherein the ratio between the TOC, cobalt, iron and zinc contained in the electrolytic copper foil follows the following formula 1:

TOC/(cobalt+iron+zinc)=1.0-1.2.    [Formula 1]

6 Claims, 1 Drawing Sheet

(51) Int. Cl.
*C25D 3/38* (2006.01)
*C25D 1/04* (2006.01)
*C25D 7/06* (2006.01)
*H01M 4/04* (2006.01)
*H01M 4/38* (2006.01)

(56) References Cited

U.S. PATENT DOCUMENTS

| | | | | |
|---|---|---|---|---|
| 2007/0287020 | A1* | 12/2007 | Saito | C25D 1/04 |
| | | | | 428/606 |
| 2016/0013493 | A1 | 1/2016 | Shinozaki | |
| 2016/0285030 | A1* | 9/2016 | Matsuura | H01L 51/5218 |

FOREIGN PATENT DOCUMENTS

| | | |
|---|---|---|
| JP | WO2014/119583 A1 | 8/2014 |
| JP | 2016-125120 A | 7/2016 |
| KR | 10-2014-0041804 A | 4/2014 |
| KR | 10-2016-0102147 | 8/2016 |
| KR | 10-2016-0119269 A | 10/2016 |

* cited by examiner

【FIG. 1】
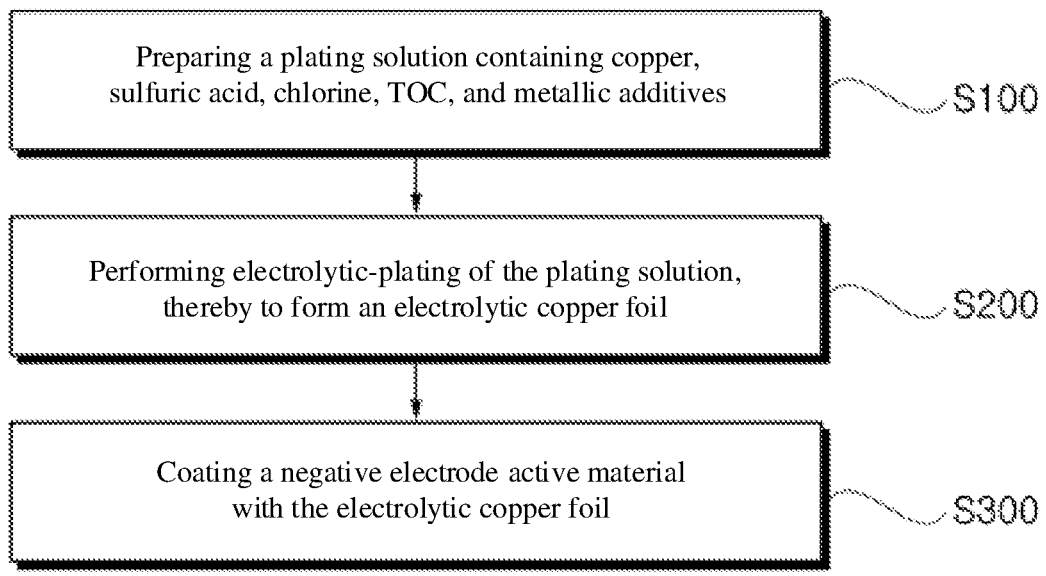
【FIG. 2】
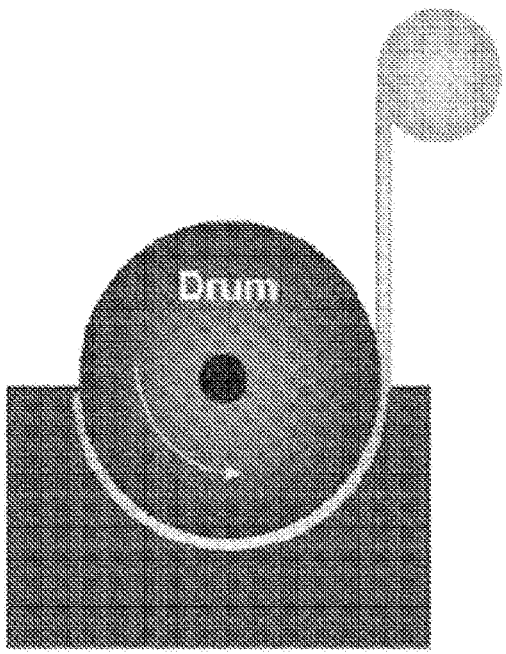

ELECTROLYTIC COPPER FOIL FOR SECONDARY BATTERY, HAVING ENHANCED PHYSICAL PROPERTIES AT LOW TEMPERATURE, AND METHOD FOR PRODUCING SAME

CROSS-REFERENCE TO PRIOR APPLICATIONS

This application is a national Stage Patent Application of PCT International Patent Application No. PCT/KR2017/003373, filed on Mar. 28, 2017 under 35 U.S.C. § 371, which claims priority of Korean Patent Application No. 10-2016-0150361, filed on Nov. 11, 2016, which are all hereby incorporated by reference in their entirety.

TECHNICAL FIELD

The present disclosure relates to an electrolytic copper foil for a secondary battery having excellent low temperature properties and a method for producing the electrolytic copper foil. More specifically, the present disclosure relates to an electrolytic copper foil for a secondary battery having excellent low temperature properties and a method for producing the electrolytic copper foil in which a low-temperature cycle characteristics of the copper foil is excellent due to a small change in properties of a tensile strength and elongation of the copper foil even at a low temperature.

BACKGROUND

In general, an electrolytic copper foil is widely used as a base material for a PCB (Printed Circuit Board) used in the electric/electronic industry. A demand to the electrolytic copper foil is rapidly increasing mainly in small-sized products such as a slim notebook computer, a personal digital assistant (PDA), an electronic book, an MP3 player, a next-generation mobile phone, and an ultra-thin flat panel display. Further, the properties of electrolytic copper foil are improved to be widely used as a negative electrode current collector for a secondary battery.

Generally, electrolytic copper foil is produced by an electrolysis method and is produced in an electrolytic bath composed of a cylindrical cathode (referred to a drum), an anode made of titanium and spaced at a constant spacing from the cathode and coated with a lead alloy or iridium oxide, an electrolytic solution and a power supply. The electrolytic solution is composed of sulfuric acid and/or copper sulfate. When a direct current flows between the cathode and the anode while rotating the cylindrical cathode, copper is electrodeposited on the cathode to enable continuous electrolytic copper foil production. The process of reducing copper ions into metal by the electrolysis method is referred to the foil manufacturing process.

The copper foil obtained from the foil manufacturing process is subjected to an additional post-treatment process, if necessary, such as, a roughness treatment (nodule treatment process) in order to improve the adhesion with the insulating substrate, a diffusion prevention treatment for preventing the diffusion of copper ions, a rust prevention treatment for preventing oxidation from the outside, and a chemical adhesion enhancement treatment to complement the adhesion to the insulation substrate. Such a post-treatment process, that is, surface treatment process may produce a low profile copper foil for a printed circuit. When only the rust-proof treatment is done in the surface treatment process, the resulting copper foil may be used for the secondary battery.

The electrodeposited copper foil, when used for printed circuit boards, is surface treated and supplied to a PCB manufacturer in a bonded form (laminate) to an insulating substrate. In contrast, when used for a secondary battery, the electrodeposited copper foil is subjected to only the rust-proofing process and then supplied to a secondary battery producing company.

Meanwhile, the secondary batteries are widely used in automobiles. A variation in the battery performance of the batteries for automobiles should be small even in the cold winter. To this end, an internal resistance value of the battery which generally increases at low temperatures must be kept constant. However, when the battery is left at a low temperature for a long time, a grain size and a crystal structure of the copper foil are changed to change the physical properties of the copper foil. This causes a problem of deteriorating the battery life.

Therefore, there is a need for the electrolytic copper foil for a secondary battery which maintains properties even when left at a low temperature for a long time.

DISCLOSURE

Technical Purposes

One purpose of the present disclosure is to provide an electrolytic copper foil for a secondary battery having excellent low temperature properties and a method for producing the electrolytic copper foil, in which TOC and metallic additives such as cobalt, iron and zinc are present in a certain amount in a copper electrolytic solution to minimize changes in the physical properties of the copper foil.

Another purpose of the present disclosure is to provide an electrolytic copper foil for a secondary battery having excellent low temperature properties and a method for producing the electrolytic copper foil, in which even at low temperatures, changes in physical properties such as tensile strength and elongation of the copper foil are small, such that the negative electrode's internal resistance is excellent even at the low temperature.

Technical Solutions

In a first aspect of the present disclosure, there is provided an electrolytic copper foil for a secondary battery, wherein the electrolytic copper foil is produced using a drum in a plating solution containing copper, total organic carbon (TOC), cobalt, iron and zinc, wherein the electrolytic copper foil is coated with a negative electrode active material, wherein a content of TOC and contents of cobalt, iron and zinc contained in the electrolytic copper foil satisfy a following Equation 1:

$$\text{TOC content}/(\text{cobalt content}+\text{iron content}+\text{zinc content})=1.0 \text{ to } 1.2. \quad \text{[Equation 1]}$$

In one implementation of the first aspect, each of a tensile strength and an elongation at −30° C. of the electrolytic copper foil is maintained to be greater than or equal to 80% of each of a tensile strength and an elongation at a room temperature of the electrolytic copper foil.

In one implementation of the first aspect, the electrolytic copper foil has one face in direct contact with the drum and the other face opposite to said one face, wherein a cross-sectional average of a grain size in said one face is smaller than or equal to 80% of a cross-sectional average of a grain size of the other face.

In one implementation of the first aspect, a concentration of the TOC contained in the plating solution is 100 ppm or greater.

In one implementation of the first aspect, a tensile strength of the electrolytic copper foil is in a range of 40 kgf/mm² to 51 kgf/mm².

In one implementation of the first aspect, an elongation of the electrolytic copper foil is in a range of 2% to 12%.

In one implementation of the first aspect, a thickness of the electrolytic copper foil is in a range of 4 μm to 10 μm.

In a second aspect of the present disclosure, there is provided a method for producing an electrolytic copper foil for a secondary battery, the method comprising: (1) preparing a plating solution containing copper, total organic carbon (TOC), cobalt, iron and zinc; (2) performing electrolytic-plating of the plating solution using a drum at a temperature of 30° C. to 70° C. by applying a current at a current density 30 ASD to 150 ASD to the drum, thereby to form an electrolytic copper foil; and (3) coating a negative electrode active material with the electrolytic copper foil, wherein a content of TOC and contents of cobalt, iron and zinc contained in the electrolytic copper foil satisfy a following Equation 1:

TOC content/(cobalt content+iron content+zinc content)=1.0 to 1.2. [Equation 1]

In one implementation of the second aspect, each of a tensile strength and an elongation at −30° C. of the electrolytic copper foil is maintained to be greater than or equal to 80% of each of a tensile strength and an elongation at a room temperature of the electrolytic copper foil.

In one implementation of the second aspect, a concentration of the TOC contained in the plating solution is 100 ppm or greater.

In one implementation of the second aspect, the electrolytic copper foil formed by the electrolytic-plating in (2) has one face in direct contact with the drum and the other face opposite to said one face, wherein a cross-sectional average of a grain size in said one face is smaller than or equal to 80% of a cross-sectional average of a grain size of the other face.

In one implementation of the second aspect, a tensile strength of the electrolytic copper foil is in a range of 40 kgf/mm² to 51 kgf/mm².

In one implementation of the second aspect, an elongation of the electrolytic copper foil is in a range of 2% to 12%.

In one implementation of the second aspect, a thickness of the electrolytic copper foil is in a range of 4 μm to 10 μm.

Technical Effects

In accordance with the present disclosure, TOC and metallic additives such as cobalt, iron and zinc are present in a certain amount in a copper electrolytic solution to minimize changes in the physical properties of the copper foil.

Further, in accordance with the present disclosure, an electrolytic copper foil for a secondary battery having excellent low temperature properties may be realized in which even at low temperatures, changes in physical properties such as tensile strength and elongation of the copper foil are small, such that the negative electrode's internal resistance is excellent even at the low temperature.

BRIEF DESCRIPTION OF THE DRAWINGS

FIG. 1 is a flow chart showing a production method of an electrolytic copper foil for a secondary battery according to one embodiment of the present disclosure.

FIG. 2 shows a process of producing an electrolytic copper foil using a drum according to one embodiment of the present disclosure.

DETAILED DESCRIPTIONS

Details of embodiments are included in the detailed description and drawings.

The advantages and features of the present disclosure, and how to accomplish them, will be apparent with reference to the embodiments as described in detail below with reference to the accompanying drawings. However, the present disclosure is not limited to the embodiments disclosed below, but may be embodied in various other forms. In the following description, when a part is connected to another part, not only they are directly connected to each other, but also, they are indirectly connected with each other part via still another part therebetween. Further, parts of the drawing that are not related to the present disclosure are omitted for clarity of explanation of the present disclosure. Like parts are designated with like reference numerals throughout the specification.

Hereinafter, the present disclosure will be described with reference to the accompanying drawings.

The following describes in greater detail an electrolytic copper foil for a secondary battery with excellent low temperature properties according to one embodiment of the present disclosure.

An electrolytic copper foil for a secondary battery according to one embodiment of the present disclosure is produced using a drum. The electrolytic copper foil for the secondary battery may be coated with a negative electrode active material. The electrolytic copper foil includes a copper foil electrolytic for a secondary battery which maintains 80% or greater of tensile strength and elongation thereof at −30° C. compared with tensile strength and elongation thereof at a room temperature.

A material for automobiles should have small variation in performance thereof depending on climate change. Therefore, variation in the battery performance of the automobile battery should be small even in the cold winter. In order to reduce the variation of the battery performance even when the external temperature is low, the internal resistance value of the battery which is generally increased at a low temperature should, otherwise, be kept constant in the low temperature. In order to keep the internal resistance value of the battery constant in the low temperature, the property of the copper foil in the battery should be kept constant even at the subzero temperature.

In order to keep the physical properties of the copper foil constant even at such a low temperature, variations in the grain size and the crystal structure of the copper foil should be minimized even when the copper foil is left at a low temperature for a long time. According to the present disclosure, the copper electrolytic solution used for copper plating should have a TOC having a concentration of 100 ppm or greater, and cobalt, iron and zinc should be incorporated inside the copper foil. This provides an electrolytic copper foil for secondary batteries where internal resistance values thereof remain constant even at low temperatures.

Accordingly, the electrolytic copper foil according to the present disclosure has a TOC having a concentration of 100 ppm or greater in the copper electrolytic solution as described above. This may minimize the change in the grain size and crystal structure in the electrolytic copper foil even when the copper foil is left at a low temperature for a long time.

As used herein, TOC is an abbreviation of "Total Organic Carbon", and means a amount of carbons among organic materials contained in a plating solution. The TOC is included in the copper electrolytic solution to minimize the change in the grain size of the copper foil. Otherwise, when the copper electrolytic solution contains dissolved carbon dioxide, which is referred to as TIC (Total Inorganic Carbon) instead of TOC, or when carbons adsorbed on the copper ions are contained in the copper electrolytic solution, following results may occur: when the copper foil is left for a long time at low temperatures, the additives present in the grain will behave abnormally and negatively affect the physical properties of the copper foil. To prevent this situation, according to the present disclosure, the TOC is present in a copper electrolytic solution at a predetermined content. Thus, the electrolytic copper foil for the secondary battery may have excellent cycle characteristics and internal resistance even at the low temperatures.

Further, the electrolytic copper foil for secondary batteries according to the present disclosure is composed of one face directly contacting the drum and the other face opposite to the one face. The cross-sectional average of the grain size of the one face may be smaller than 80% of the cross-sectional average of the other face의 grain size. The cross-sectional average of the grain size of each of the one face and the other face refers to the cross-sectional average of the grain size of each of the one face and the other face at a room temperature. The room temperature refers to a temperature range of 15° C. to 25° C. When the cross-sectional average of the grain size of the one face is greater than 80% of the cross-sectional average of the grain size of the other face, the grain size and crystal structure of the electrolytic copper foil are changed, and thus the battery life is negatively affected when the battery is left at low temperature for a long time.

FIG. 1 is a flow chart illustrating a method for producing an electrolytic copper foil for a secondary battery according to one embodiment of the present disclosure. Referring to FIG. 1, a method for producing an electrolytic copper foil for a secondary battery according to the present disclosure includes (1) preparing a plating solution containing 60 g/L to 140 g/L of copper ions ($Cu^{2+}$), 70 g/L to 200 g/L of sulfuric acid, 10 ppm to 90 ppm of chlorine, and 100 ppm or greater of TOC, cobalt, iron and zinc (S100); (2) performing electrolytic-plating using a drum by applying current density 30 ASD to 150 ASD at a temperature of 30° C. to 70° C. to form an electrolytic copper foil (S200); and (3) coating a negative electrode active material with the electrolytic copper foil (S300).

In step (1) (S100), as a step of preparing the plating solution, the plating solution containing 60 g/L to 140 g/L of copper ions ($Cu^{2+}$), 70 g/L to 200 g/L of sulfuric acid, 10 ppm to 90 ppm of chlorine, 100 ppm or greater of TOC, and cobalt, iron and zinc may be prepared. The TOC in the plating solution plays a role in minimizing changes in the grain size and crystal structure in the electrolytic copper foil even when the copper foil is left at low temperature for a long time.

Further, in accordance with the present disclosure, the plating solution further contains cobalt, iron and zinc as metallic additives in addition to TOC, to further minimize changes in the physical properties of the electrolytic copper foil at low temperatures. The electrolytic copper foil may be produced by performing the electrolytically-plating using the plating solution. In the plating solution, the TOC may be contained in a constant content. The cobalt may be contained at 1 mg/L to 50 mg/L therein, the iron may be contained at 400 mg/L to 1100 mg/L, and the zinc may be contained at 50 mg/L to 700 mg/L.

In an electrolytic copper foil formed by electrolytic-plating the plating solution containing the TOC, cobalt, iron and zinc, the concentration of the TOC is preferably 100 ppm or greater. The contents of the cobalt, iron and zinc may be set to meet a following Equation 1.

When the electrolytic copper foil is produced by electrolytic-plating the plating solution, the contents of the additives such as TOC, cobalt, iron and zinc that are contained in the plating solution may not always be equal to those in the electrolytic copper foil produced via the electrolytic-plating. Rather, the former may be substantially same as or smaller than the latter.

The cobalt, iron and zinc are used to control a plating rate of the copper during electrolytic plating to smoothen a surface of the copper foil. The cobalt, iron and zinc are used to suppress an excessive increase in the carbon content inside the electrolytic copper foil. Thus, when a ratio between a sum of contents of the cobalt, iron and zinc and the TOC content in the electrolytic copper foil meets the following Equation 1, the change in the physical properties of the electrolytic copper foil is minimized at low temperatures.

$$\text{TOC content}/(\text{cobalt content}+\text{iron content}+\text{zinc content})=1.0 \text{ to } 1.2 \quad \text{[Equation 1]}$$

When TOC content/(cobalt content+iron content+zinc content) is smaller than 1.0, the content of the sum of cobalt, iron and zinc added to the plating solution is increased to inhibit a degree at which the TOC prevents abnormal growth in the plating solution. When TOC content/(cobalt content+ iron content+zinc content) exceeds 1.2, stress is generated in the grain due to excessive TOC content in the electrolytic copper foil. In this case, after plating, the grains in the electrolytic copper foil grow abnormally and the physical properties change at low temperatures is considerable. Therefore, to minimize the change in the physical properties of the electrolytic copper foil even at low temperatures, TOC content/(cobalt content+iron content+zinc content) may be preferably between 1.0 and 1.2 to meet the Equation 1.

When the contents of copper ions and sulfate ions in the plating solution are out of the above defined range, there is a problem that, in the electrolytic-plating performed subsequently, the copper is not properly precipitated or the hardness of the copper foil is lowered.

Further, in the plating solution, chlorine is contained at a concentration of 10 ppm to 90 ppm. Chlorine allows $CuCl_2$ precipitates formed at the interface of the grain boundaries during electrolytic-plating to suppress the crystal growth when the plating solution is heated to high temperatures, thereby improving thermal stability at high temperatures. When the chlorine concentration is out of the range of 10 ppm to 90 ppm, the tensile strength of the electrolytic copper foil may be lowered and thermal stability at high temperature may be lowered.

In Step (2) (S200), the plating solution prepared in the step (1) has current at a current density of 30 ASD (Ampere per Square Deci-metre) to 150 ASD applied thereto under a condition of a temperature of 30° C. to 70° C., thereby to perform the electrolytic-plating using a drum. For reference, FIG. 2 shows a process of producing an electrolytic copper foil using a drum according to one embodiment of the present disclosure. When the plating temperature and current density are out of the above range, the surface of the electrolytic copper foil is not uniformly formed because the plating is not properly performed, such that the tensile strength and elongation may decrease, which may cause deterioration of battery performance.

In step (3) (S300), coating a negative electrode active material on the electrolytic copper foil formed by the electrolytic-plating may be executed. The electrolytic copper foil coated with the negative electrode active material via the step (3) (S300) may maintain a tensile strength and elongation at −30° C. greater than or equal to 80% of the tensile strength and elongation of the foil at the room temperature.

Further, the electrolytic copper foil formed by the electrolytic-plating via the step (2) has one face in contact with the drum and the other face opposite to the one face. The cross-sectional average of the grain size of the one face may be smaller than 80% of the grain size cross-sectional average of the other face. When a difference between the grain sizes of the one and other faces of the electrolytic copper foil is large, the characteristics of the battery will change. Thus, it is preferable that the cross-sectional average of the grain size of the one face may be smaller than 80% of the grain size cross-sectional average of the other face.

Further, the tensile strength of the electrolytic copper foil for the secondary battery according to the present disclosure is preferably in a range of 40 kgf/mm$^2$ to 51 kgf/mm$^2$. When the tensile strength is lower than 40 kgf/mm$^2$, the electrolytic copper foil may break and the positive electrode and negative electrode may be short-circuited. During charging and discharging of the secondary battery, the volume of the secondary battery expands or shrinks when active materials such as graphite exchange lithium ions. At this time, the active material layer is in contact with the electrolytic copper foil, such that stress due to the expansion or shrinkage occurs. Therefore, when the tensile strength is lower than 40 kgf/mm$^2$, the electrolytic copper foil fails to withstand the stress and may break. Thus, the batter performance may be deteriorated. Further, the positive electrode and the negative electrode may be short-circuited due to the deformation due to the fracture.

Further, the elongation of the electrolytic copper foil for secondary batteries according to the present disclosure is preferably in a range between 2 and 12%. When the elongation of the electrolytic copper foil is high, this withstands the tension to prevent a fracture in coating the active material of the electrode production process, and, further, this may prevent the fracture which may otherwise occur due to a stress resulting from the process of winding the electrode. Further, the efficiency of the battery is improved by preventing the deterioration of the efficiency in the charge-discharge cycle of the battery and preventing the breakage. However, when the elongation exceeds 12%, the deformation of the secondary battery may become severe during charging and discharging, resulting in the short circuit. When the elongation is smaller than 2%, the electrolytic copper foil may break easily.

The aforementioned tensile strength and elongation are inversely proportional to each other. Thus, as the tensile strength increases, the elongation decreases, while as the tensile strength decreases, the elongation increases. In order to produce the electrolytic copper foils with the high tensile strength while preventing the breakage, it is important to maintain the appropriate range of the tensile strength and elongation. Therefore, the tensile strength is preferably maintained in the range of 40 kgf/mm$^2$ to 51 kgf/mm$^2$, and the elongation is preferably in the range of 2% to 12%.

Further, a thickness of the electrolytic copper foil for secondary batteries according to the present disclosure is preferably in a range of between 4 and 10 μm. When the thickness of the electrolytic copper foil is smaller than 4 μm, the electrolytic copper foil may easily break due to the thinness. When the thickness of the electrolytic copper foil exceeds 10 μm, the volume and weight of the produced secondary battery increases, which is not preferable.

Hereinafter, the Present Examples and the Comparative Examples in the present disclosure are described. However, the following Present Examples are merely the preferred examples of the present disclosure, and the scope of the present disclosure is not limited to the following Present Examples.

Experiment 1. Battery Life Test According to TOC Concentration and Low Temperature Tensile Strength and Elongation/Room Temperature Tensile Strength and Elongation Present Example 1

A plating solution containing copper ions 90 g/L, sulfuric acid 120 g/L, chlorine 30 ppm, TOC 360 ppm, cobalt 0.025 g/L, iron 0.75 g/L and zinc 0.375 g/L (total amount of cobalt, iron and zinc: 1.150 g/L) was prepared. An electrolytic-plating of the plating solution was performed using a drum at a current density of 90 ASD at 50 degrees C. The negative electrode active material was coated on the electrolytic copper foil formed by the electrolytic-plating.

Present Example 2 to Present Example 8

Electrolytic copper foils were produced in the same manner as Present Example 1 except that a concentration of TOC contained in the plating solution and a sum of cobalt, iron and zinc therein were set as shown in following Tables 2 and 3.

Comparative Example 1 to Comparative Example 3

Electrolytic copper foils were produced in the same manner as Present Example 1 except that a concentration of TOC contained in the plating solution and a sum of cobalt, iron and zinc therein were set as shown in following Tables 2 and 3.

The experimental conditions for Present Example 1 to Present Example 8 and Comparative Example 1 to Comparative of Example 3 are as described above. For the electrolytic copper foils for the secondary battery as produced in accordance with Present Example 1 to Present Example 8 and Comparative Example 1 to Comparative of Example 3, low temperature (30° C.) tensile strength and elongation, a ratio between grain sizes of one face contacting the drum and the other face opposite to the one face, TOC content/(cobalt content+iron content+zinc content) after dissolving the copper foil, and a battery lifespan after 300 cycles were measured or calculated. The measurements are shown in the following Tables 2 and 3.

The tensile strength and elongation were measured as follows: each of the electrolytic copper foils obtained in accordance with Present Example 1 to Present Example 8 and Comparative Examples 1 to 3 was cut into a 12.7 mm width×a gauge length of 50 mm to form a tensile specimen. Then, the specimens were subjected to a tensile test at a crosshead rate of 50.8 mm/min in accordance with the IPC-TM-650 2.4.18B standard. A maximum load corresponding to a tensile strength as measured is defined as a tensile strength. An elongation at which the specimen breaks is defined as an elongation. The tensile strength and elongation were measured at a room temperature and −30° C., respectively.

Further, TOC content/(cobalt content+iron content+zinc content) after dissolving the copper foil was obtained as follows. Each of the electrolytic copper foils obtained according to Present Example 1 to Present Example 8 and Comparative Example 1 to Comparative Example 3 was dissolved into 60 ml of hydrochloric acid (35%) and 40 ml of hydrogen peroxide (30%). The dissolved solution was analyzed using ICP (Inductively coupled plasma mass spectrometry). In this connection, a sum of the metallic additives is the sum of cobalt, iron, and zinc. The ratio between the TOC content and the total content of the metallic additives is calculated using Equation 1 as described above. The following table 3 shows the results.

The battery evaluation conditions were set as follows. A cell design, anode, cathode, separator, and electrolyte conditions were set as shown in the following Table 1.

1) Constant current charging: Current value 1C, end-of-charge voltage 4.2V
2) Charging stop for 20 minutes
3) Constant current discharging: Current value 1C, end-of-charge voltage: 2.5V cut off
4) 1 C=487 mAh
5) Cycle: 300 cycles, temperature: 25° C.

TABLE 1

| High-level Classification | Low-level Classification | Unit | Specification |
|---|---|---|---|
| Cell design | Size | mm | 34 × 50 |
| | Capacity | mAh | 487 |
| | Current density | mAh/cm$^2$ | 3.06 |
| | N/P ratio | — | 1.10 |
| Positive electrode | Active material | — | LCO |
| | Composition | Active material: conductive material:Binder | 92:4:4 |
| | L/L | mg/cm$^2$ | 21.72 |
| | Mixture density | g/cm$^3$ | 3.0 |
| Negative electrode | Active material | — | Natural graphite |
| | Composition | Active material: Thickener:Binder | 96:2:2 |
| | L/L | mg/cm$^2$ | 9.00 |
| | Mixture density | g/cm$^3$ | 1.50 |
| Separator | Material | — | PE |
| | Thickness | μm | 16 |
| Electrolytic liquid | Salt | — | 1.0M LiPF$_6$ |
| | Solvent | — | EC:EMC = 3:7 |
| | Additive | — | VC 3% |
| | Amount | ∝ | 2.0 |

TABLE 2

| Examples | Thickness (μm) | Room temperature tensile strength | Room temperature elongation | −30 degrees C. tensile strength | −30 degrees C. elongation |
|---|---|---|---|---|---|
| Present Example 1 | 4 | 43.7 | 3.2 | 37.6 | 2.9 |
| Present Example 2 | 6 | 42.3 | 7.2 | 35.2 | 6.3 |
| Present Example 3 | 6 | 35.2 | 7.8 | 31.1 | 7.0 |
| Present Example 4 | 8 | 45.3 | 7.5 | 37.6 | 6.6 |
| Present Example 5 | 8 | 31.8 | 11.8 | 28.6 | 9.9 |
| Present Example 6 | 10 | 41.3 | 11.8 | 36.8 | 11.8 |
| Present Example 7 | 10 | 33.6 | 11.9 | 27.2 | 9.8 |
| Present Example 8 | 10 | 49.2 | 10.5 | 41.8 | 8.4 |
| Present Example 9 | 12 | 33.4 | 18 | 30.7 | 14.8 |
| Comparative Example 1 | 6 | 35.1 | 6.2 | 27.4 | 4.3 |
| Comparative Example 2 | 8 | 34.4 | 11.0 | 25.5 | 8.4 |
| Comparative Example 3 | 10 | 33.0 | 12.4 | 24.4 | 6.2 |

TABLE 3

| Examples | −30 degrees C. tensile strength/room temperature ensile strength | −30 degrees C. elongation/room temperature elongation | Grain size (μm) of one face/grain size of the other face (μm) | TOC concentration | TOC/(Co + Fe + Zn) after dissolving | Battery lifespan after 300 cycles |
|---|---|---|---|---|---|---|
| Present Example 1 | 0.86 | 0.90 | 0.40(0.75/1.86) | 360 | 1.15 | 66.5 |
| Present Example 2 | 0.83 | 0.88 | 0.41(0.81/1.95) | 250 | 1.14 | 65.5 |
| Present Example 3 | 0.88 | 0.9 | 0.77(1.51/1.96) | 102 | 1.20 | 65.4 |
| Present Example 4 | 0.83 | 0.88 | 0.36(0.62/1.72) | 1080 | 1.15 | 66.9 |
| Present Example 5 | 0.90 | 0.84 | 0.55(0.89/1.6) | 120 | 1.05 | 65.0 |
| Present Example 6 | 0.89 | 1.00 | 0.51(0.92/1.78) | 650 | 1.11 | 66.7 |
| Present Example 7 | 0.81 | 0.82 | 0.37(0.78/2.07) | 480 | 1.02 | 67.2 |

TABLE 3-continued

| Examples | −30 degrees C. tensile strength/room temperature ensile strength | −30 degrees C. elongation/room temperature elongation | Grain size (μm) of one face/grain size of the other face (μm) | TOC concentration | TOC/(Co + Fe + Zn) after dissolving | Battery lifespan after 300 cycles |
|---|---|---|---|---|---|---|
| Present Example 8 | 0.85 | 0.80 | 0.41(0.76/1.85) | 350 | 1.20 | 67.0 |
| Present Example 9 | 0.92 | 0.82 | 0.77(1.51/1.96) | 100 | 1.00 | 65.0 |
| Comparative Example 1 | 0.78 | 0.70 | 0.81(1.59/1.96) | 80 | 0.93 | 62.9 (fracture or peeled) |
| Comparative Example 2 | 0.74 | 0.76 | 0.81(1.69/2.07) | 99 | 0.83 | 63.4 (fracture or peeled) |
| Comparative Example 3 | 0.74 | 0.50 | 0.83(1.71/2.04) | 70 | 0.85 | 61.8 (fracture or peeled |

Referring to Table 2 and Table 3, it may be seen that, in Comparative Example 1 to Comparative Example 3 where the TOC concentration is lower than 100 ppm, both the tensile strength and elongation at −30° C. were smaller than 80%. On the other hand, in Present Example 1 to Present Example 8 where the TOC concentration is all 100 ppm or greater, the tensile strength and elongation at −30° C. are above 80%. In the electrolytic copper foil production, when the TOC is contained in the plating solution at a concentration of 100 ppm or greater, this may prevent the grain size and crystal structure in the copper foil from changing in the electrolytic-plating. Thus, the variations in the tensile strength and elongation at −30° C. may be smaller. Thus, the battery lifespan may be excellent.

Further, in Comparative Example 1 to Comparative Example 3 in which TOC content/(cobalt content+iron content+zinc content) is lower than 1.0, the tensile strength and elongation at −30° C. is maintained to be lower than 80% of those at the room temperature. Thus, the batter lifespan is short after 300 cycles. When TOC content/(cobalt content+iron content+zinc content) is lower than 1.0, the total content of cobalt, iron and zinc is increasing such that the TOC in the plating solution is poor at preventing the abnormal growth of the grain. Thus, the change in the physical properties of electrolytic copper foil at low temperatures was significant.

Further, the grain size of one face/the grain size of the other face is below 80% in Present Example 1 to Present In Example 8, such that the battery lifespan after 300 cycles is excellent. When the grain size of one face/the grain size of the other face is above 80%, there is a problem that the physical properties of the electrolytic copper foil may vary at low temperatures to deteriorate battery performance. On the other hand, in Comparative Example 1 to 3 in which the grain size of one face/the grain size of the other face is above 80%, the battery lifespan after 300 cycles is poor.

Further, referring to Table 3, in order to check the state of the electrolytic copper foil (acting as a negative electrode plate) of the batteries according to Present Examples 1 to 8 and Comparative Example 1 to 3, which were subjected to 300 charging and discharging cycles, we disassembled the batteries. In this connection, the electrolytic copper foils according to Present Examples 1 to 8 could be confirmed to have the same appearance as an initial appearance without defects. On the other hand, in Comparative Example 1 to 3, the life span of the battery is deteriorated and a portion of the electrolytic copper foil was fractured or peeled off. Specifically, in Comparative Example 1, it was confirmed that the negative electrode active material was peeled off from the electrolytic copper foil. In Comparative Examples 2 and 3, we could confirm that fractured portions were present in an outer portion of the electrolytic copper foil.

Those of ordinary skill in the art to which the present disclosure belongs may understand that the present disclosure may be embodied in other specific forms without departing from the spirit or essential characteristics thereof. It is to be understood, therefore, that the presently disclosed embodiments are to be considered in all respects as illustrative and not restrictive. The scope of the present disclosure is set forth in the following claims rather than the detailed description. It is intended that all changes and modifications derived from the meaning and scope of the claims and their equivalents be included in the scope of the present disclosure.

What is claimed is:

1. An electrolytic copper foil for a secondary battery, comprising:
    a layer that contains total organic carbon (TOC) and metallic additives that contain cobalt, iron and zinc, wherein the layer is capable of being coated with a negative electrode active material, and
    wherein a ratio of the TOC to the cobalt, iron and zinc contained in the layer satisfies a following Equation 1:

$$TOC/(cobalt+iron+zinc)=1.0 \text{ to } 1.2. \quad [\text{Equation 1}]$$

2. The electrolytic copper foil of claim 1, wherein each of a tensile strength and an elongation at −30° C. of the electrolytic copper foil is maintained to be greater than or equal to 80% of each of a tensile strength and an elongation at room temperature of the electrolytic copper foil.

3. The electrolytic copper foil of claim 1, wherein the layer of the electrolytic copper foil has a first face and a second face that is opposite to the first face, and
    wherein a cross-sectional average of a grain size in said first face is smaller than or equal to 80% of a cross-sectional average of a grain size of the second face.

4. The electrolytic copper foil of claim 1, wherein a tensile strength of the electrolytic copper foil is in a range of 40 kgf/mm$^2$ to 51 kgf/mm$^2$.

5. The electrolytic copper foil of claim 1, wherein an elongation of the electrolytic copper foil is in a range of 2% to 12%.

6. The electrolytic copper foil of claim 1, wherein a thickness of the electrolytic copper foil is in a range of 4 μm to 10 μm.

* * * * *